US012650631B2

(12) United States Patent
Gausmann et al.

(10) Patent No.: US 12,650,631 B2
(45) Date of Patent: Jun. 9, 2026

(54) SUPERCONTINUUM APPARATUS, METHODS, AND APPLICATIONS

(71) Applicant: UNIVERSITY OF CENTRAL FLORIDA RESEARCH FOUNDATION, INC., Orlando, FL (US)

(72) Inventors: Stefan Gausmann, Orlando, FL (US); Axel Schulzgen, Orlando, FL (US)

(73) Assignee: UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 312 days.

(21) Appl. No.: 18/556,963

(22) PCT Filed: Apr. 21, 2022

(86) PCT No.: PCT/US2022/025798
§ 371 (c)(1),
(2) Date: Oct. 24, 2023

(87) PCT Pub. No.: WO2022/245466
PCT Pub. Date: Nov. 24, 2022

(65) Prior Publication Data
US 2024/0210786 A1 Jun. 27, 2024

Related U.S. Application Data

(60) Provisional application No. 63/183,659, filed on May 4, 2021.

(51) Int. Cl.
*G02F 1/35* (2006.01)
*G02F 1/355* (2006.01)
*G02F 1/365* (2006.01)

(52) U.S. Cl.
CPC .......... *G02F 1/3528* (2021.01); *G02F 1/3551* (2013.01); *G02F 1/365* (2013.01)

(58) Field of Classification Search
CPC ........................ G02F 1/35–397; G02F 1/3528
See application file for complete search history.

(56) References Cited

U.S. PATENT DOCUMENTS

2015/0117474 A1* 4/2015 Jiang ................... H01S 3/06795
372/6
2016/0070059 A1* 3/2016 Chen ................. G02B 6/02314
65/393

(Continued)

OTHER PUBLICATIONS

International Search Report and Written Opinion for PCT/US2022/025798 mailed dated Dec. 5, 2022, 12 pages.

(Continued)

*Primary Examiner* — Rhonda S Peace
(74) *Attorney, Agent, or Firm* — Klintworth & Rozenblat LLP

(57) ABSTRACT

The discovery of a clear correlation between the Anderson localization length and the dispersion properties of highly localized TALOF modes allowed us to demonstrate that the zero dispersion wavelength can be tuned over more than 300 nm within the same fiber by selected excitation of specific modes. This enabled apparatus and methods for generating tunable, multi-octave-spanning supercontinuum (SC) spectra in a bandwidth from 460 nm to 1750 nm. Associated applications are also presented.

13 Claims, 6 Drawing Sheets

(56) References Cited

U.S. PATENT DOCUMENTS

| | | | |
|---|---|---|---|
| 2019/0227226 A1* | 7/2019 | Abaie | ............... G02B 6/02304 |
| 2024/0210786 A1* | 6/2024 | Gausmann | ............ G02F 1/3551 |

OTHER PUBLICATIONS

Abaie. "Transverse Anderson localization in optical fibers: high-quality wave transmission and novel lasing applications" UNM Optical Science and Engineering ETDS. Web. Dec. 5, 2018. [Retrieved Nov. 14, 2022]. Retrieved from the Internet: URL https://digitalrepository.unm.edu/cgi/viewcontent.cgi?article=1065&context=ose_etds; p. xvii, section 4.2.2 paragraphs 3,4; section 5.1.1 paragraph 1; section 5.3; p. 69 section 5.3.1 paragraph 2; Figure 5.12; section 5.4.2 paragraph 1; section 6.1 paragraphs 1,3.

Kudlinski. "Zero-dispersion wavelength decreasing photonic crystal fibers for ultraviolet-extended supercontinuum generation" Optics Express vol. 14 Issue 12. Web. Jun. 12, 2006; [Retrieved Nov. 14, 2022]. Retrieved from the Internet: URL https://opg.optica.org/DirectPDFAccess/477ED2BF-7AD9-4F1B-83E682F7DF58FD9C_90333/oe-14-12-5715.pdf?da=1&id=90333seq=0&mobile=no; abstract; Section 1, Introduction, paragraph 1; Fig. 2; section 2 paragraphs 1-2; section 3.1 paragraph 1; Section 3.2, paragraph 1.

Zhao. "Image Transport Through Meter-Long Randomly Disordered Silica-Air Optical Fiber" Scientific Reports. Web. Feb. 15, 2018; [Retrieved Nov. 14, 2022]. Retrieved from the Internet: URL https://www.nature.com/articles/s41598-018-21480-0; see entire document.

* cited by examiner a)

b)

c)

SUPERCONTINUUM APPARATUS, METHODS, AND APPLICATIONS

RELATED APPLICATION DATA

The instant application claims priority to Provisional U.S. Patent Application No. 63/183,659 filed May 4, 2021, the subject matter of which is incorporated by reference in its entirety to the fullest extent allowed by law.

GOVERNMENT FUNDING

Funding for the invention was provided by the National Science Foundation (NSF) under Grant ECCS 1711230; the Army Research Office (ARO) under contracts W911NF-19-1-0426, W911NF-17-1-0501, and W911NF-12-1-0450; and the Air Force Office of Scientific Research (AFOSR) under FA9550-15-1-0041 and FA8651-18-20019. The U.S. government has certain rights in the invention.

BACKGROUND

Non-limiting aspects and embodiments most generally pertain to the field of optical supercontinuum generation; more particularly to transverse Anderson localization optical fiber (TALOF) supercontinuum generation apparatus, methods, and applications thereof; and, most particularly to tunable, multi-octave-spanning TALOF supercontinuum generation apparatus, methods, and applications thereof.

Transverse Anderson localization in optics is a remarkable phenomenon and describes the confinement of light in a dielectric medium with a transverse random and longitudinal uniform refractive index distribution. This localization effect is caused by strong scattering of light in the transverse direction and leads to the formation of so-called Anderson-modes that can propagate freely in the invariant longitudinal direction. The observation of Anderson-modes in one and two dimensional optical systems has triggered the development of a novel fiber class that relies on random refractive index distributions instead of traditional core cladding structures to guide light (see Zhao et al., *Image Transport Through Meter-Long Randomly Disordered Silica-Air Optical Fiber*, SCIENTIFIC REPORTS (2018) 8:3065; Zhao et al., *A path to high-quality imaging through disordered optical fibers: a review*, Applied Optics, 58, No. 13 (1 May 2019). The localized modes in transverse Anderson localization fibers (TALOFs) have demonstrated exceptional and to some degree counter intuitive properties, such as disorder-induced single mode transmission with low propagation loss as well as high resiliency to fiber bending, high quality wave fronts, and a weak wavelength-dependency of the mode size. These unique TALOF properties have been successfully exploited for applications such as high quality image transport, light focusing, quantum key distribution, random lasing, and four wave mixing. It would be desirable to expand the current application space of TALOFs into novel as well as classical fiber domains such as optical communication and nonlinear optics.

The inventors have recognized that an understanding of fundamental fiber properties such as the dispersion of Anderson modes is critical to this domain expansion. The inventors have further recognized that the zero dispersion wavelength of highly localized Anderson modes is strongly correlated with the Anderson localization length and can be widely tuned by changing the mode excitation conditions. The discovery of this unique property enabled multi-octave-spanning supercontinuum (SC) generation in a glass-air TALOF apparatus, solving an existing problem of having to fabricate multiple fibers with different dispersion parameters in order to generate different SC spectra, along with the entirety of benefits and advantages associated therewith. Such apparatus and methods are enabled as described herein below and in the appended claims.

SUMMARY

An aspect of the invention is a tunable, multi-octave-spanning supercontinuum (SC) generating apparatus (referred to hereinafter as a 'tunable SC apparatus'). In an exemplary aspect the tunable SC apparatus includes a pump laser and a length of TALOF characterized by a plurality of Anderson mode propagation channels each characterized by an Anderson mode localization length between 2 to 15 microns (u), operationally disposed to receive the pump laser output at an input end thereof. In various non-limiting, exemplary embodiments and aspects the tunable SC apparatus may have one or more of the following features, characteristics, limitations, or functions alone or in various combinations:

wherein the pump laser has a peak pulse power between 100 W and 1 MW;

wherein the pump laser output has a wavelength between 400 nm to 2400 nm;

wherein the pump laser output has a laser linewidth between 0.1 nm to 40 nm;

wherein the pump laser output has a wavelength that transmits through silica fiber;

wherein the pump laser output is characterized by a single transverse mode;

wherein the length of TALOF is between 1 cm to 1 m;

wherein the TALOF is a silica/air TALOF.

An aspect of the invention is a method for generating tunable, multi-octave supercontinuum (SC) spectra. In an exemplary aspect the method includes the steps of providing a pump laser characterized by a spectral output wavelength between 400 nm to 2400 nm, a laser linewidth between 0.1 nm to 40 nm, and a peak pulse power between 100 W and 1 MW; providing a length of TALOF having a plurality of Anderson mode propagation channels each characterized by an Anderson mode localization length between 2μ to 15μ; inputting the pump laser output to a respective Anderson mode propagation channel to excite an Anderson mode having a zero dispersion wavelength (ZDW) sufficiently matching the pump laser output wavelength to generate a SC output spectrum from the respective channel. In various non-limiting, exemplary embodiments and aspects the method may include one or more of the following steps, features, characteristics, limitations, or functions alone or in various combinations:

further comprising inputting the pump laser output to a different Anderson mode propagation channel having a different Anderson localization length to generate a respective different SC output spectrum from the respective different channel;

further comprising changing a pump pulse parameter and inputting the pump laser output to the same Anderson mode propagation channel to generate a different SC output spectrum from the same channel;

further comprising changing the at least one pump pulse parameter selected from pulse peak power, pulse duration, pulse chirp, and pulse center wavelength;

wherein the TALOF is a silica/air TALOF.

DETAILED DESCRIPTION OF NON-LIMITING, EXEMPLARY EMBODIMENTS

Figure 1:
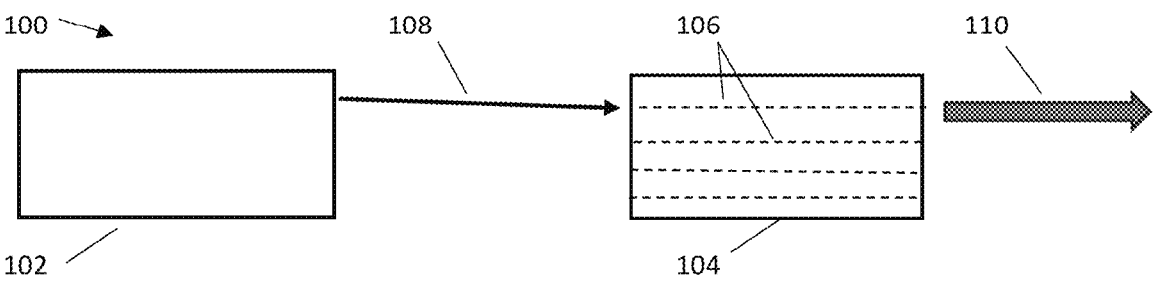
FIG. 1 is a schematic, side-elevational view block diagram of a tunable SC apparatus according to an embodiment.

Disclosed embodiments are described with reference to the attached figures, wherein like reference numerals are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships and methods are set forth to provide a more complete understanding of the embodiments disclosed herein.

For clarity and conciseness, the term 'Anderson mode localization length' as used herein is equivalent to the square root of the effective area of the Anderson mode; in short, the 'localization length' quantifies the transverse Anderson mode extent (e.g., diameter or width).

The terms 'highly localized' and 'localized' refer to Anderson mode localization lengths between 2 microns to 15 microns (u).

An aspect of the invention is a tunable, multi-octave-spanning supercontinuum (SC) generating apparatus (referred to hereinafter as a 'tunable SC apparatus') 100 as illustrated in FIG. 1. In an exemplary aspect the tunable SC apparatus 100 includes a pump laser 102 and a length of TALOF 104 characterized by a plurality of Anderson mode propagation channels 106, (see FIG. 2a) each characterized by an Anderson mode localization length (see FIG. 2b) between 2 to 15 microns (μ), operationally disposed to receive the pump laser output 108 at an input end thereof. Upon proper excitation of an Anderson mode in a respective propagation channel, a supercontinuum spectrum 110 is output from the TALOF, as further described below.

Figure 2:
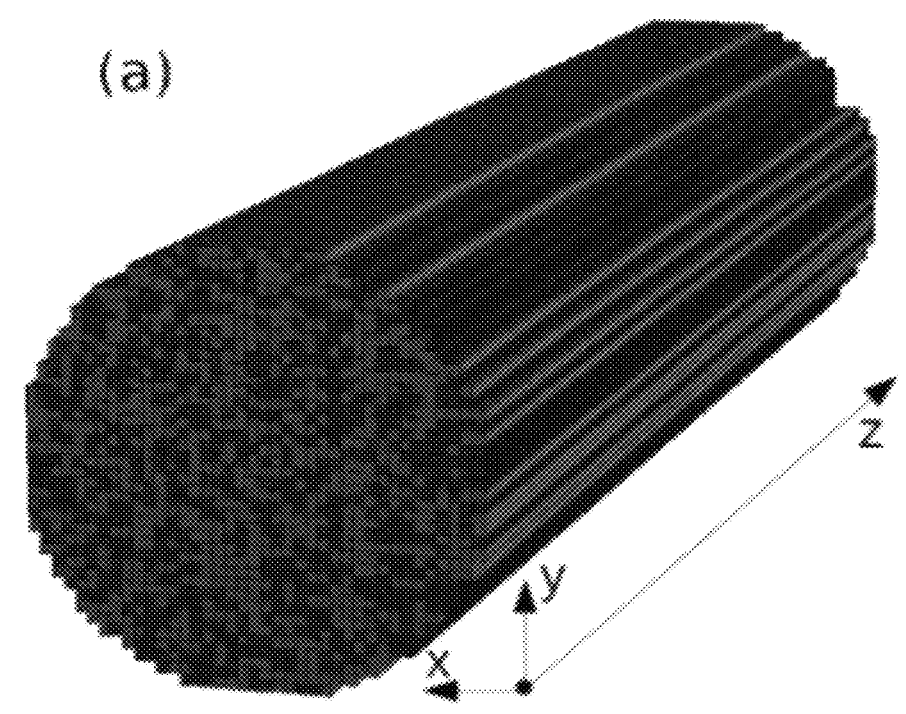
FIG. 2a schematically illustrates a segment of a TALOF fiber having multiple Anderson mode propagation channels.
FIG. 2b pictorially illustrates a representative Anderson mode localization length, according to illustrative embodiments.
Figure 2:
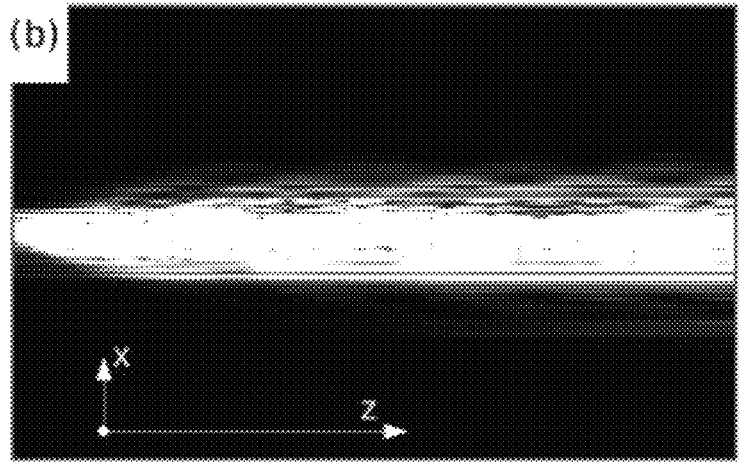

As mentioned above, the manufacture of TALOFs is known in the art. The glass-air TALOF used in our investigation was fabricated in-house at CREOL using the stack and draw technique. The fiber had an outer diameter of 452±4 mm and a wall thickness of 73±1 mm leaving a randomized area of roughly 0.11 mm$^2$. The number of modes supported in the random area of this fiber was estimated to be on the order of 10$^5$ for a wavelength of 1μ. A Scanning electron micrograph (SEM) image of the TALOF facet is shown in FIG. 2. The dark regions in the SEM image correspond to air while the bright regions represent fused silica. The air filling fraction across the entire TALOF is roughly 27% and the air hole area distribution extracted from the SEM image has a maximum at 4μ$^2$. The random distribution of air holes across the fiber in combination with the varying air hole size and structural invariance in the longitudinal direction results in strong transverse scattering of light at visible and infrared wavelengths as it propagates through the TALOF and ultimately leads to the formation of Anderson modes. While the Anderson modes supported by this type of TALOF can have a wide range of spatial frequencies and extents, we focused our study on highly localized Anderson modes for two reasons: firstly, because highly localized Anderson modes have demonstrated excellent wave front quality and good broad band transmission properties that make them interesting for imaging and communication applications; secondly, such highly localized modes were primarily excited in our experiments launching Gaussian shaped beams into the TALOF. We considered every transversally trapped light state to be Anderson localized due to the strong disorder in this fiber; however, we confined our investigations to Anderson mode localization lengths between 2-15μ, which we refer to herein as 'localized' or 'highly localized'. Compared to other reported binary material TALOFs, the constituents of our glass-air TALOF have a rather high refractive index contrast of 1.45, which results in stronger scattering and therefor stronger transverse localization of light.

Figure 3:
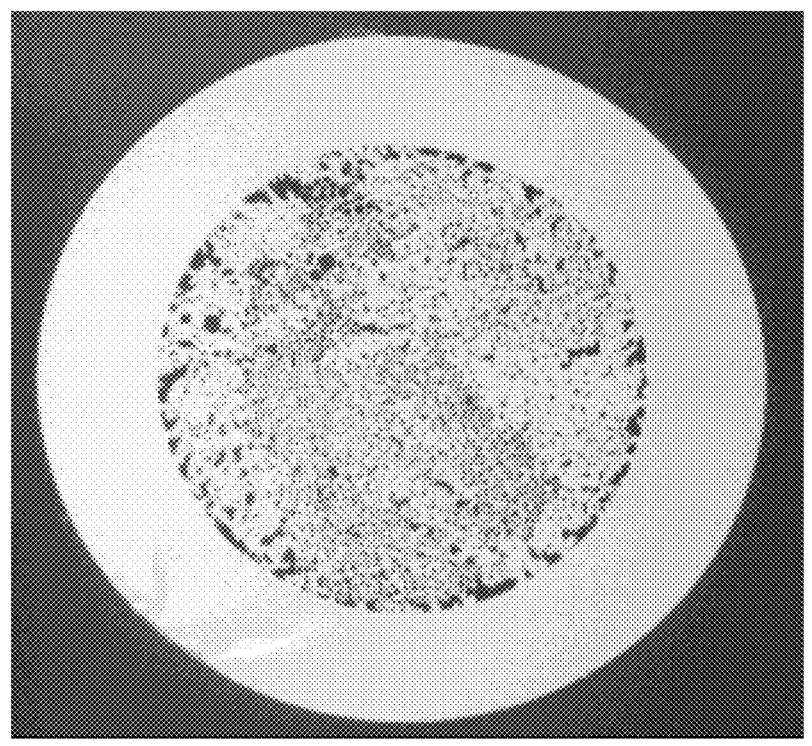
FIG. 3 shows a scanning electron micrograph (SEM) image of the TALOF facet.

We measured the chromatic dispersion properties of highly localized Anderson-modes in our glass/air TALOF as well as their respective Anderson mode localization lengths. We performed multiple dispersion measurements and calculated for each Anderson mode the corresponding average dispersion values and standard deviations to estimate the dispersion parameter D as well as the measurement error caused by thermal and mechanical changes of our setup and by imperfections of our fit function. We extracted from the averaged dispersion curves the zero dispersion wavelength (ZDW) as well as the dispersion parameter D at 1.03μ and 1.55μ and plotted these dispersion properties as a function of localization length as shown in FIGS. 3(b-d).

We observed a clear correlation between the Anderson-mode size (localization length) and the dispersion properties of the highly localized Anderson modes. We advantageously discovered that the ZDW of highly localized Anderson modes shifts to shorter wavelengths as the localization length decreases. The observed shift exceeded 300 nm in our TALOF for different localized modes within the same fiber segment. Our measurements also confirmed our ability to selectively excite highly localized Anderson modes with anomalous dispersion for wavelengths that are within the emission band of Ti:Sapphire and Ytterbium lasers making these modes highly interesting for pulse compression and nonlinear applications. Advantageously, we observed different dispersion properties within the same TALOF segment that heretofore were observed in silica fibers requiring different core diameters. Therefore, we were able to access different, specific dispersion properties in a single TALOF simply by scanning our excitation input over different highly localized Anderson modes instead of having to fabricate multiple fibers with different dimensions. We believe that this new and unique fiber property makes our TALOF an advantageous platform for spatio-temporal effects as well as nonlinear optics.

Our discovery of the correlation between the Anderson-mode size (localization length) and the dispersion properties of the highly localized Anderson modes enabled the broadband (multi-octave) SC generating apparatus and methods described herein and in the appended claims.

In order to evaluate which highly localized Anderson modes are favorable for multi-octave SC generation, we calculated numerically the spectral width of supercontinua generated in our 11.7 cm length TALOF sample as a function of localization length and pump pulse peak power. We limited our study to Anderson modes with localization lengths between 2.2μ and 9.9μ because this subset of modes has been primarily observed, was easy to excite during our dispersion measurement, and covers modes with negative and positive dispersion parameters as well as modes with dispersion parameters close to zero for a pump laser wavelength of 1.03μ.

We observed that Anderson modes with localization lengths smaller than 3μ are capable of generating very broad SC spectra at rather moderate pulse peak powers because those Anderson modes feature anomalous dispersion in the 1μ wavelength region (see FIG. 3(b)). At the same time, they provide high power densities due to the strong localization.

Figure 4:
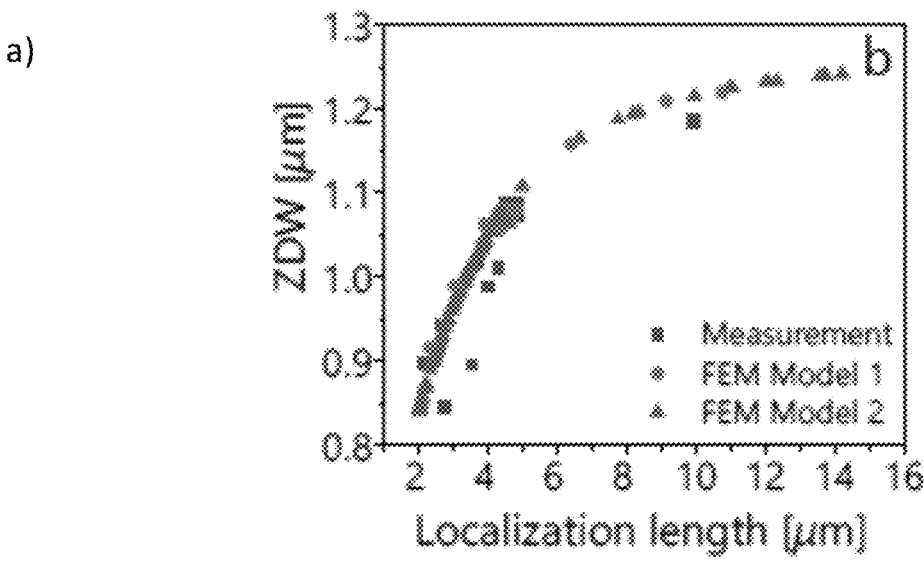
FIG. 4a shows a graphical comparison of measured (squares) and calculated zero dispersion wavelength (FEM Model 1: circles, FEM Model 2: triangles) as a function of localization length.
FIGS. 4(b) and (c) show graphical comparisons of measured (squares) and calculated dispersion parameters D for a wavelength of 1.55 μm and 1.03 μm as a function of localization length (FEM Model 1: circles, FEM Model 2: triangles).
Figure 4:
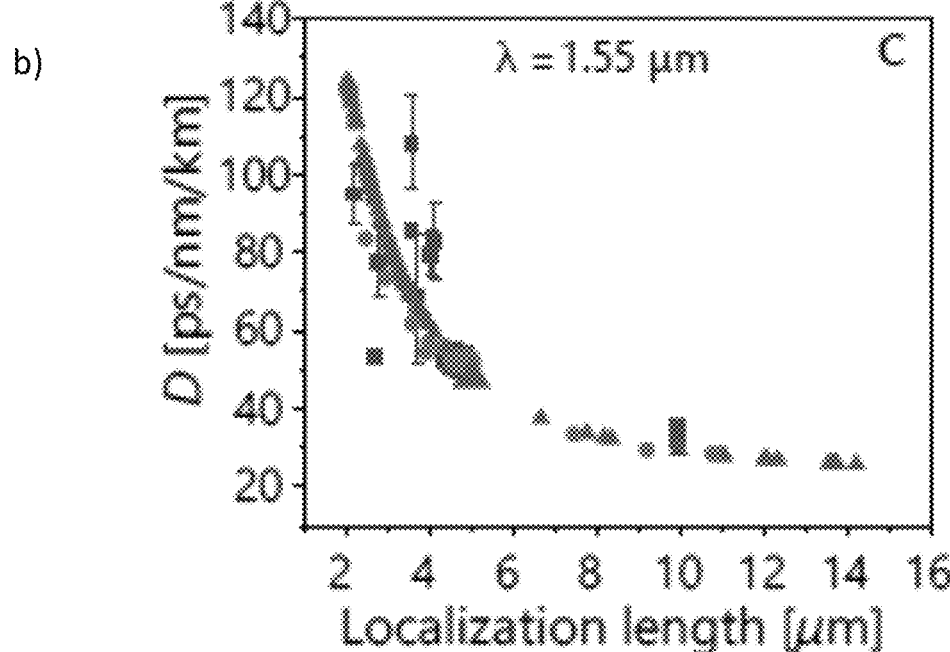
Figure 4:
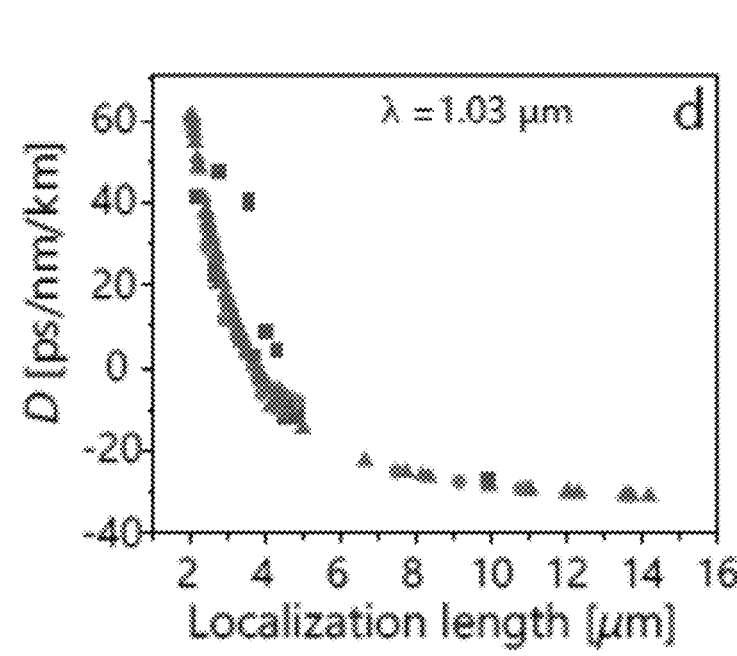

FIG. 4 illustrates three different SC spectra generated by a pulse with 40 kW peak power by exiting three different highly localized Anderson modes within our TALOF.

Figure 5:
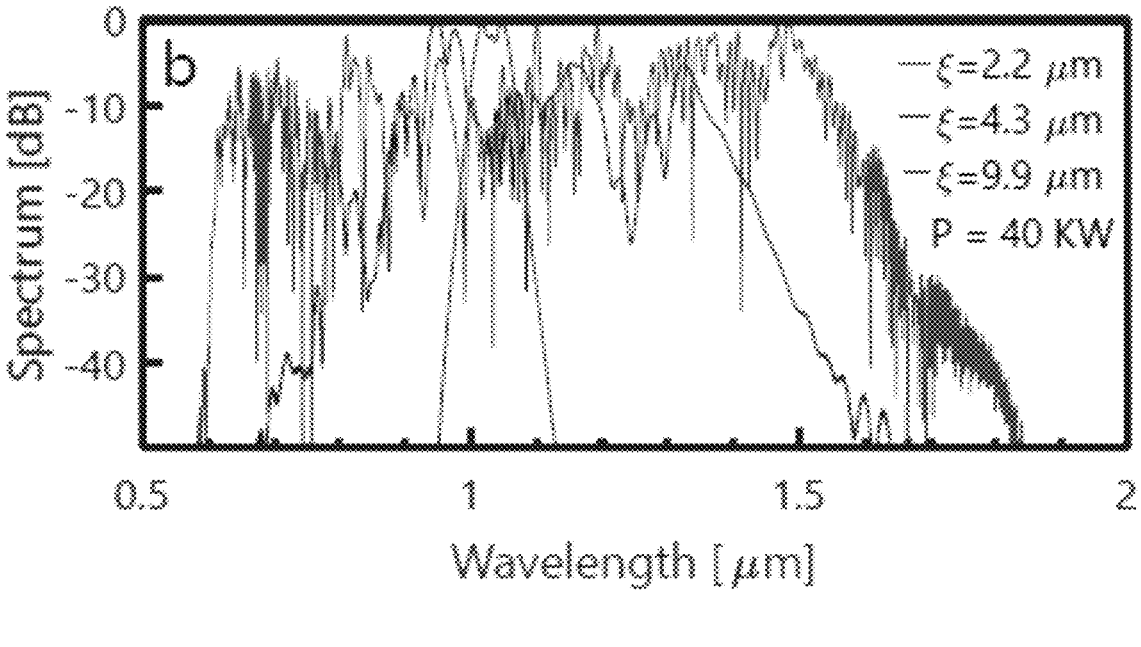
FIG. 5 graphically illustrates three different SC spectra generated by a pulse with 40 kW peak power by exiting three different highly localized Anderson modes within our TALOF.

FIG. 5 shows three different SC spectra generated by coupling differently attenuated pump pulses into a single highly localized Anderson mode with a localization length of approximately 2.6μ.

Figure 6:
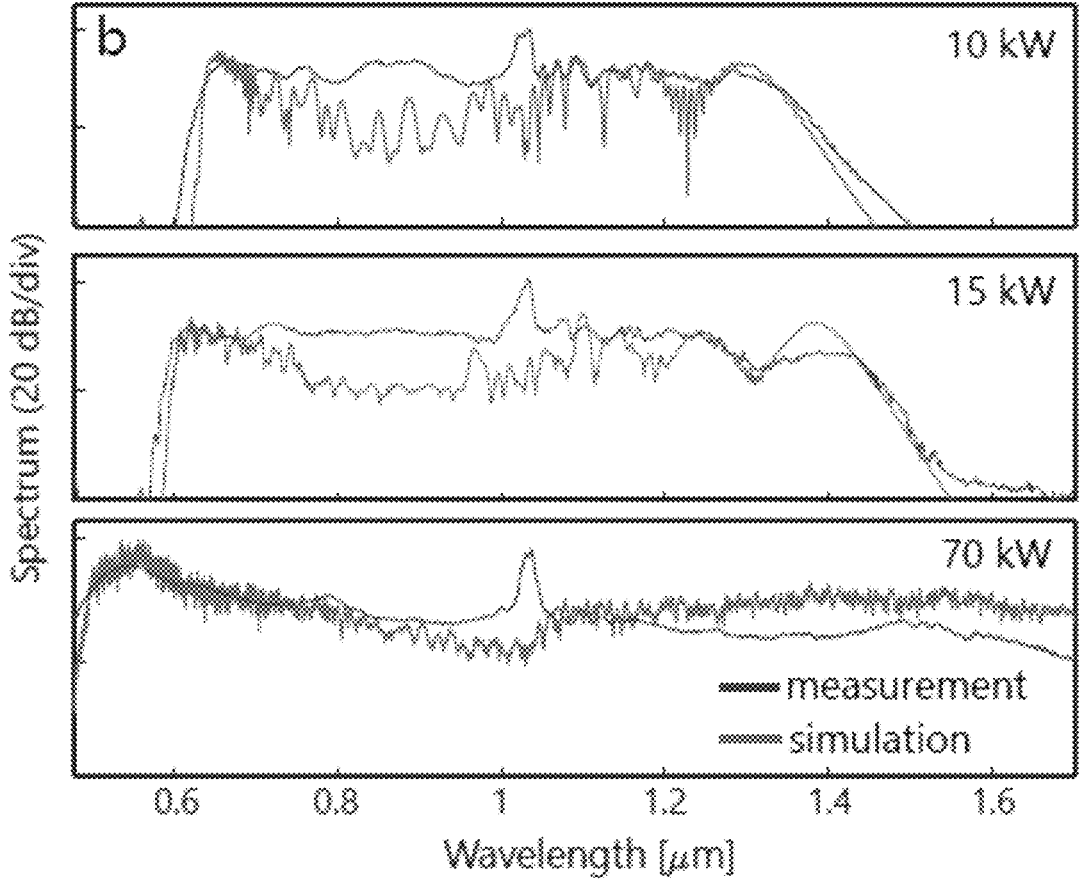
FIG. 6 graphically illustrates comparisons between measured and calculated supercontinuum spectra for input peak powers of 10 kW. 15 kW and 70 KW propagating through 11.7 cm TALOF in a single strongly localized mode with localization length of 2.6 μm, according to illustrative embodiments of the invention.
Figure 7:
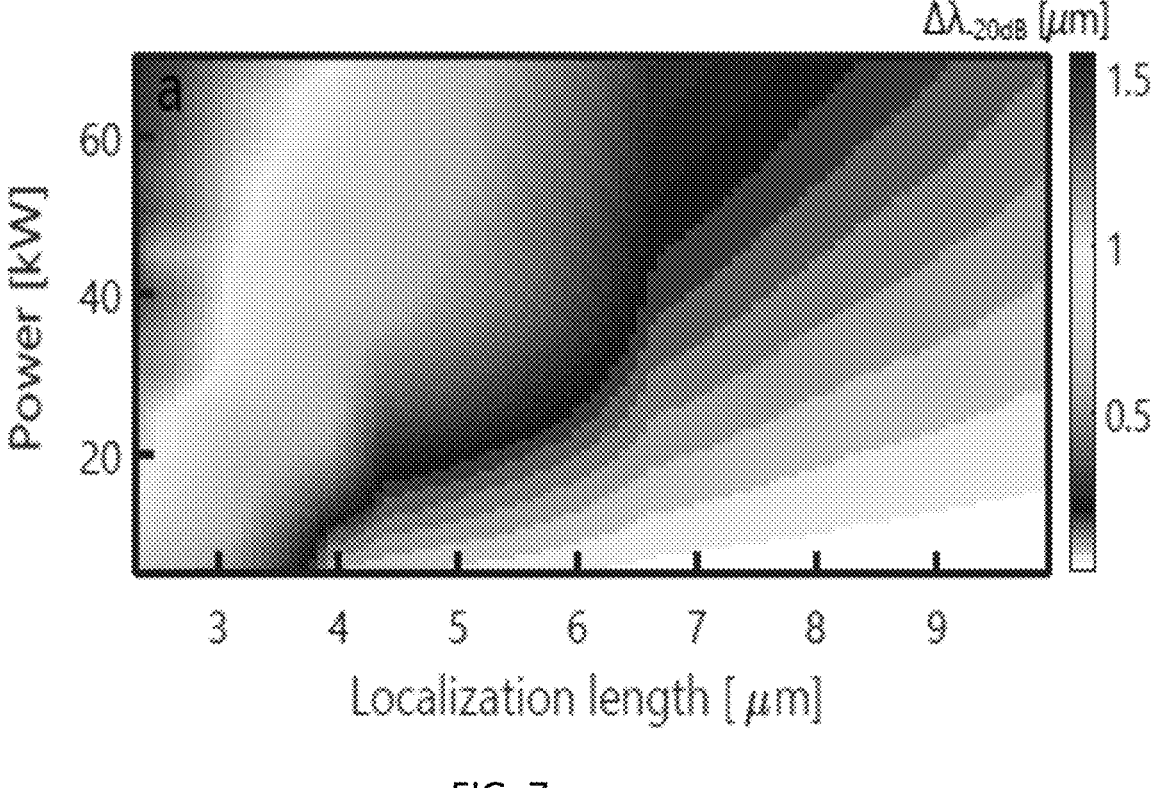
FIG. 7 graphically shows a −20 dB spectral width of supercontinua calculated as a function of pulse peak power for different Anderson localization lengths in a 11.7 cm glass-air TALOF, and at the launched peak power of 70 kW the generated SC was from 462 nm to 1750 nm.

FIG. 6 shows that at the launched peak power of 70 KW, the generated SC was from 462 nm to 1750 nm using the –20 dB level as a reference.

The broad band SC generation discussed hereinabove is just one example of advantageous applications for which the tunable dispersion properties of highly localized TALOF modes can be used. We note that the same short length segment of TALOF and the same pump laser can be utilized to generate supercontinua with a variety of different spectral and temporal features or coherence properties depending on which highly localized Anderson mode is excited. In addition, the widely tunable ZDW allows for a large flexibility in choosing the pump laser wavelength for SC generation, which is a clear advantage of our glass-air TALOF compared to conventional photonic crystal fibers, for example, where a change in fiber geometry is required to fundamentally change the dispersion properties and the SC generation process. TALOFs are highly multimode systems like conventional step index multimode fibers with the key difference that guided modes in TALOFs can be spatially isolated due to the strong disorder and do not cover the entire guiding region of the fiber.

Notwithstanding that the numerical ranges and parameters setting forth the broad scope of the disclosed embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

While various disclosed embodiments have been described above, it should be understood that they have been presented by way of example only and not as a limitation. Numerous changes to the disclosed embodiments can be made in accordance with the specification herein without departing from the spirit or scope of this specification. Thus the breadth and scope of this specification should not be limited by any of the above-described embodiments; rather, the scope of this specification should be defined in accordance with the appended claims and their equivalents.

We claim:

1. A tunable, multi-octave-spanning supercontinuum (SC) generating apparatus, comprising:
   a pump laser; and
   a length of TALOF characterized by a plurality of Anderson mode propagation channels each characterized by an Anderson mode localization length between 2 to 15 microns (μ), operationally disposed to receive the pump laser output at an input end thereof.

2. The tunable SC apparatus of claim 1, wherein the pump laser has a peak pulse power between 100 W and 1 MW.

3. The tunable SC apparatus of claim 1, wherein the pump laser output has a wavelength between 400 nm to 2400 nm.

4. The tunable SC apparatus of claim 1, wherein the pump laser output has a laser linewidth between 0.1 nm to 40 nm.

5. The tunable SC apparatus of claim 1, wherein the pump laser output has a wavelength that transmits through silica fiber.

6. The tunable SC apparatus of claim 1, wherein the pump laser output is characterized by a single transverse mode.

7. The tunable SC apparatus of claim 1, wherein the length of TALOF is between 1 cm to 1 m.

8. The tunable SC apparatus of claim 1, wherein the TALOF is a silica/air TALOF.

9. A method for generating tunable, multi-octave supercontinuum (SC) spectra, comprising:
   providing a pump laser characterized by a spectral output wavelength between 400 nm to 2400 nm, a laser linewidth between 0.1 nm to 40 nm, and a peak pulse power between 100 W and 1 MW;
   providing a length of TALOF having a plurality of Anderson mode propagation channels each characterized by an Anderson mode localization length between 2μ to 15μ;
   inputting the pump laser output to a respective Anderson mode propagation channel to excite an Anderson mode having a zero dispersion wavelength (ZDW) sufficiently matching the pump laser output wavelength to generate a SC output spectrum from the respective channel.

10. The method of claim 9, further comprising inputting the pump laser output to a different Anderson mode propagation channel having a different Anderson localization length to generate a respective different SC output spectrum from the respective different channel.

11. The method of claim 9, further comprising changing a pump pulse parameter and inputting the pump laser output to the same Anderson mode propagation channel to generate a different SC output spectrum from the same channel.

12. The method of claim 11, further comprising changing the at least one pump pulse parameter selected from pulse peak power, pulse duration, pulse chirp, and pulse center wavelength.

13. The method of claim 9, wherein the TALOF is a silica/air TALOF.

* * * * *